(12) United States Patent
Peng et al.

(10) Patent No.: US 11,811,500 B2
(45) Date of Patent: Nov. 7, 2023

(54) SYSTEM SYNCHRONIZATION METHOD

(71) Applicant: WENZHOU UNIVERSITY, Wenzhou (CN)

(72) Inventors: Zhihui Peng, Wenzhou (CN); Shichen Wang, Wenzhou (CN); Xinshu Yu, Wenzhou (CN); Chengkang Yu, Wenzhou (CN)

(73) Assignee: WENZHOU UNIVERSITY, Wenzhou (CN)

( * ) Notice: Subject to any disclaimer, the term of this patent is extended or adjusted under 35 U.S.C. 154(b) by 203 days.

(21) Appl. No.: 17/505,657

(22) Filed: Oct. 20, 2021

(65) Prior Publication Data

US 2022/0140928 A1    May 5, 2022

(30) Foreign Application Priority Data

Nov. 2, 2020  (CN) .......................... 202011202770.6

(51) Int. Cl.
*H04J 3/06* (2006.01)
*H04J 3/16* (2006.01)
*H04L 12/40* (2006.01)

(52) U.S. Cl.
CPC .......... *H04J 3/0638* (2013.01); *H04J 3/1676* (2013.01); *H04L 12/40039* (2013.01); *H04L 12/40058* (2013.01)

(58) Field of Classification Search
USPC ........................................................ 370/350
See application file for complete search history.

(56) References Cited

U.S. PATENT DOCUMENTS

| | | | | |
|---|---|---|---|---|
| 5,448,732 A * | 9/1995 | Matsumoto | ............. | G06F 8/458 |
| | | | | 713/375 |
| 6,163,549 A * | 12/2000 | Bortolini | ............... | H04J 3/0685 |
| | | | | 370/503 |
| 2004/0153857 A1* | 8/2004 | Yamazaki | ........... | G06F 12/0815 |
| | | | | 714/E11.063 |
| 2006/0224926 A1* | 10/2006 | Iwamoto | .......... | G01R 31/31901 |
| | | | | 714/38.13 |
| 2007/0061927 A1* | 3/2007 | Hashimoto | ............... | G06F 1/08 |
| | | | | 968/801 |
| 2015/0029764 A1* | 1/2015 | Peng | ....................... | H02M 7/49 |
| | | | | 363/37 |

* cited by examiner

*Primary Examiner* — Gregory B Sefcheck
*Assistant Examiner* — Majid Esmaeilian
(74) *Attorney, Agent, or Firm* — Bayramoglu Law Offices LLC

(57) ABSTRACT

A system synchronization method includes: connecting synchronization modules of a plurality of devices together through a synchronization bus. The synchronization modules include a signal generation module, a switch control module, a synchronization bus monitoring module, and a switch S1. A signal output terminal of the signal generation module is connected to a first terminal of the switch S1, and a timing overflow terminal of the signal generation module is connected to the switch control module configured to control the switch S1. The switch control module is connected to the synchronization bus monitoring module. A second terminal of the switch S1 is connected to the switch control module and the synchronization bus monitoring module. The system synchronization method has the advantages of simple structure, low cost, high reliability, and good practicability.

4 Claims, 3 Drawing Sheets

SYSTEM SYNCHRONIZATION METHOD

CROSS REFERENCE TO THE RELATED APPLICATIONS

This application is based upon and claims priority to Chinese Patent Applications No. 202011202770.6, filed on Nov. 2, 2020, the entire contents of which are incorporated herein by reference.

TECHNICAL FIELD

The present invention relates to a system synchronization method, and more particularly, to a system synchronization method used in scenarios in which a complex system requires synchronization control or synchronization measurement.

BACKGROUND

In the fields of machinery, electronics, electrical engineering, electric power, computer, chemical engineering, measurement and control, and the like, synchronization is usually required in complex systems. For example, a UPS system needs to synchronously control inverter output. In a parallel drive system, a plurality of drive controllers need to be adjusted and controlled synchronously. In the field of instrumentation, a plurality of output signals need to be synchronized. In the field of measurement and control, synchronization measurement needs to be performed to obtain distribution of a measured object in different spatial locations at an identical moment. Synchronization performance is directly related to the performance of a system, and even to the safe and reliable operation of the system.

SUMMARY

The present invention is intended to provide a system synchronization method. The present invention has the advantages of simple structure, low cost, high reliability, and good practicability.

The technical solution of the present invention is as follows: A system synchronization method includes: connecting synchronization modules of a plurality of devices together through a synchronization bus, where the synchronization modules include a signal generation module, a switch control module, a synchronization bus monitoring module, and a switch S1; a signal output terminal of the signal generation module is connected to one terminal of the switch S1, and a timing overflow terminal of the signal generation module is connected to the switch control module configured to control the switch S1; the switch control module is connected to the synchronization bus monitoring module; and the other terminal of the switch S1 is connected to the switch control module and the synchronization bus monitoring module.

In the foregoing system synchronization method, the synchronization modules include:

the signal generation module, where an input of the signal generation module is connected to a power supply Power, an output signal $PWM_i$ of the signal generation module is connected to an input of the switch S1, and a timing overflow signal $OV\_i$ of the signal generation module is connected to an enable terminal En of the switch control module; when the power supply is turned on, a delay timer of the signal generation module starts to work; after a delay of $T_d$, the signal generation module starts a periodical timer and generates a periodic signal $PWM_i$ and a periodic overflow pulse signal $OV\_i$, where the switch control module determines whether to output $PWM_i$ to a synchronization bus to become a synchronization signal Syn, and $OV\_i$ is used to enable the switch control module;

the switch S1, where the input of the switch S1 is connected to $PWM_i$, an output of the switch S1 is connected to the synchronization bus, and the switch S1 is controlled by $Ctl_i$ of the switch control module to allow $PWM_i$ to be connected to or disconnected from the synchronization bus; S1 is disconnected by default;

the switch control module, where the enable terminal En of the switch control module is connected to $OV\_i$ of the signal generation module, a lock terminal Lock of the switch control module is connected to the synchronization bus, a reset terminal Rst of the switch control module is connected to Reset of the synchronization bus monitoring module, and the output $Ctl_i$ of the switch control module is connected to the switch S1; when Reset is at a low level, the switch control module controls on or off of the switch S1 based on a relationship between $OV\_i$ and the synchronization signal Syn of the synchronization bus; and once Reset is at a high level, the switch control module is reset to an initial power-on state; and the synchronization bus monitoring module, where an input of the synchronization bus monitoring module is connected to the synchronization bus, and the output Reset of the synchronization bus monitoring module is connected to Rst of the switch control module; the synchronization bus monitoring module is configured to monitor whether a signal loss time of the synchronization bus exceeds a preset time; if the preset time is exceeded, Reset outputs a high level, otherwise it outputs a low level.

In the foregoing system synchronization method, the signal generation module works in the following way: when the system is powered on, the signal generation module enables an internal power-on delay function; after the delay is over, an internal timer with a duration of T starts to work, and $PWM_i$ with a duty cycle of 0.5 and a periodic overflow pulse signal $OV\_i$ are output, where $PWM_i$ and $OV\_i$ have an identical period; the output signal $Ctl_i$ of the switch control module controls on or off of the switch S1, and further controls $PWM_i$ to be connected to or disconnected from the synchronization bus, thereby functioning as a bus control switch and generating the synchronization signal Syn.

In the foregoing system synchronization method, the switch control module works in the following way: when no rising edge exists at an input terminal Lock and Reset is at a low level, if $OV\_i$ has a rising edge, $Ctl_i$ changes from a low level to a high level and is locked; in this case, the switch S1 is turned on, the signal $PWM_i$ is output to the synchronization bus, and Syn is generated; once Syn is generated, a rising edge appears at Lock of the switch control module, the switch control module locks En to terminate receiving $OV\_i$, and $Ctl_i$ remains at a high level; in addition, a current timing value of an internal timer of the synchronization bus monitoring module is reset to zero; since Syn is a periodic signal, as long as a period of Syn is less than a period of the timer of the synchronization bus monitoring module, the output Reset of the synchronization bus monitoring module is not at high level.

In the foregoing system synchronization method, the synchronization bus monitoring module is configured to monitor whether the synchronization signal Syn on the synchronization bus is lost; if the signal loss time exceeds a timing value preset inside the monitoring module, an output reset signal Reset is at a high level, otherwise it is at a low level; a current timing value of a timer is in unilateral increment mode, when the timing value reaches a preset value, the timing value remains at the preset value, and Reset remains at a high level; once a rising edge is monitored at Syn, the current timing value of the timer is immediately reset to zero, and Reset is reset to zero.

Compared with the prior art, the present invention has the following advantages:
1. Compared with the communication-based synchronization solution, the synchronization method provided in the present invention has a simpler structure.
2. The synchronization method in the present invention supports hot plugging, can effectively inhibit loss of Syn due to poor contact, component failure or interference, and has a powerful anti-interference capability and high stability and reliability.
3. Compared with the communication-based synchronization solution, the present invention does not require data exchange, so that a frequency of the synchronization signal does not need to be high, and a requirement on impedance of the synchronization bus is low.
4. The synchronization method provided in the present invention does not require a communication protocol, does not affect the operation of internal software of the modules, and can synchronize modules of different models and different manufacturers, achieving a high compatibility.
5. The electronic components required by the synchronization method of the present invention are all commonly used components and modules, reducing costs and achieving higher cost performance.

DETAILED DESCRIPTION OF THE EMBODIMENTS

The following further describes the present invention with reference to the accompanying drawings and embodiments, but the embodiments do not limit the present invention.

Figure 1:
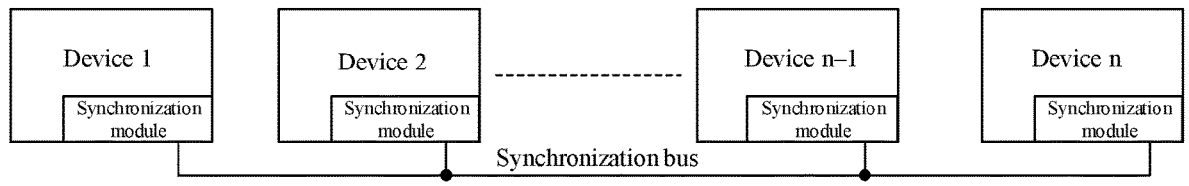
FIG. 1 is a structural diagram of the present invention.
Figure 2:
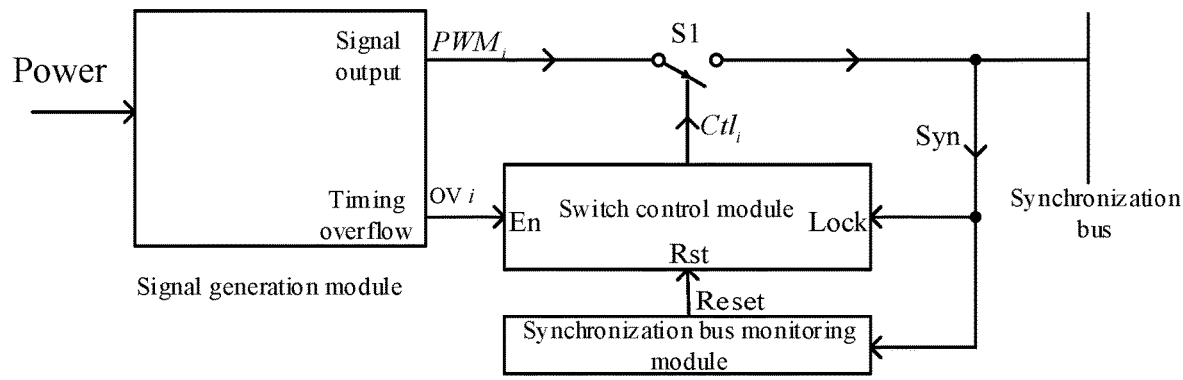
FIG. 2 is a structural diagram of a synchronization module.

Embodiment: FIG. 1 shows composition of a system synchronization method. A system generally includes n devices, and synchronization modules of the devices are connected together through a synchronization bus. As shown in FIG. 2, the synchronization modules include a signal generation module, a switch control module, a synchronization bus monitoring module, and a switch S1, where a signal output terminal of the signal generation module is connected to one terminal of the switch S1, and a timing overflow terminal of the signal generation module is connected to the switch control module configured to control the switch S1; the switch control module is connected to the synchronization bus monitoring module; and the other terminal of the switch S1 is connected to the switch control module and the synchronization bus monitoring module. A signal on the synchronization bus is a synchronization signal Syn.

Specifically, the synchronization modules include:
the signal generation module, where an input of the signal generation module is connected to a power supply Power, an output signal $PWM_i$ of the signal generation module is connected to an input of the switch S1, and a timing overflow signal OV_i of the signal generation module is connected to an enable terminal En of the switch control module; the signal generation module implements the following functions: when the system is powered on, the signal generation module enables an internal power-on delay function; after the delay is over, an internal timer with a period of T starts to work, and $PWM_i$ with a duty cycle of 0.5 and a periodic overflow pulse signal OV_i are output, where $PWM_i$ and OV_i have an identical period; an output signal $Ctl_i$ of the switch control module controls on or off of the switch S1, and further controls $PWM_i$ to be connected to or disconnected from the synchronization bus, thereby functioning as a bus control switch and generating a synchronization signal Syn;
the switch S1, where the input of the switch S1 is connected to $PWM_i$, and an output of the switch S1 is connected to the synchronization bus, the switch S1 is controlled by $Ctl_i$ of the switch control module to allow $PWM_i$ to be connected to or disconnected from the synchronization bus;
the switch control module, where the enable terminal En of the switch control module is connected to OV_i of the signal generation module, a lock terminal Lock of the switch control module is connected to the synchronization bus, a reset terminal Rst of the switch control module is connected to Reset of the synchronization bus monitoring module, and the output $Ctl_i$ of the switch control module is connected to the switch S1; basic functions of the switch control module are as follows: when no rising edge exists at an input terminal Lock and Reset is at a low level, if OV_i has a rising edge, $Ctl_i$ changes from a low level to a high level and locked; in this case, the switch S1 is turned on, the signal $PWM_i$ is output to the synchronization bus, and Syn is generated; once Syn is generated, a rising edge appears at Lock of the switch control module, the switch control module locks En to terminate receiving OV_i, and $Ctl_i$ remains at a high level; in addition, a current timing value of an internal timer of the synchronization bus monitoring module is reset to zero; since Syn is a periodic signal, as long as a period of Syn is less than a period of the timer of the synchronization bus monitoring module, an output Reset of the synchronization bus monitoring module is not at a high level; and
the synchronization bus monitoring module, where an input of the synchronization bus monitoring module is connected to the synchronization bus, and the output Reset of the synchronization bus monitoring module is connected to Rst of the switch control module; the synchronization bus monitoring module is configured to monitor whether a signal loss time of the synchronization bus exceeds a preset time; the synchronization bus monitoring module is basically configured to monitor whether the synchronization signal Syn on the synchronization bus is lost if the signal loss time exceeds a timing value preset inside the monitoring module, an output reset signal Reset is at a high level, otherwise it is at a low level; a current timing value of a timer is in unilateral increment mode; when the timing value reaches the preset value, the timing value remains at the preset value, and Reset remains at a high level; once a rising edge is monitored at Syn, the current timing value of the timer is immediately reset to zero, and Reset is reset to zero;

by default, in an initial state, outputs of all signal generation modules are low, that is, $PWM_i$, $Ctl_i$, $OV\_i$, and Reset are all at low level, and the switch S1 is open. The working process of the synchronization modules is as follows:

1. Due to the difference in the running time of the modules, n periodic overflow pulse signals OV_i appear at different time points. The first appearing OV_i enable the switch control module to lock $Ctl_i$ as high, S1 is turned on, $PWM_i$ is output to the synchronization bus, and the signal Syn appears. Once Syn appears, a rising edge is definitely monitored at Lock, En of the switch control module is locked and is out of control of OV_i, and $ctl_i$ remains unchanged. Similarly, once Syn appears, the current timing value and Reset of the synchronization bus monitoring module are reset to zero, and the bus monitoring module does not act. The switch control module and the synchronization bus monitoring module operate in this way: once Syn is generated, the switch control modules of all synchronization modules are locked, so that a unique synchronization signal Syn can be obtained in the system through contention.

2. In a case that Syn already exists in the system, when a new device is being inserted into the system at a specified moment, because a synchronization module of the new device needs a delay for a process from power-on to output of $PWM_i$ and OV_i signals, during this delay time, a switch control module of the synchronization module of the new device will definitely receive Syn, and therefore locks En of the switch control module, so that $Ctl_i$ is always zero and S1 remains open. Similarly, a synchronization bus monitoring module of the new device will definitely receive Syn within this time, and therefore resets a current timing value of a timer of the synchronization bus monitoring module, and Reset remains at a low level. The foregoing process shows that the newly inserted device does not affect the existing Syn signal.

3. In a case that Syn exists, when a device is unplugged from the system at a specified moment, there are two different cases: (1) the unplugged device generates no Syn signal, and the Syn signal of the system is not affected, as indicated by the function diagrams and analysis; (2) the unplugged device generates the Syn signal, and the Syn signal in the system is lost. During the loss of Syn, timer values of all synchronization bus monitoring modules in the system continue to increase. When the timer value of the synchronization bus monitoring module reaches a preset value, the Reset signal is at a high level. In this case, all switch control modules in the system are reset to a default state, and their En terminals receive OV_i. Because OV_i signals of all the signal generation modules in the system are not reset synchronously, there is also a time difference in OV_i, so that a new Syn signal is obtained through contention.

4. In the case of Syn loss due to factors such as poor contact caused by short-term strong vibration, if the loss time does not exceed the preset value of the timer of the synchronization bus monitoring module, Syn will definitely appear on the synchronization bus. As long as Syn appears, the timer of the synchronization bus monitoring module is reset to zero, no Reset signal is output, the PWM output control module is not reset, and the system operates properly.

The known related parameters are: ① $T_s$=0.1 s; ② PWM signal duty cycle=0.5; ③ power-on delay $T_d$=1 s; ④ preset timing value for continuous Syn loss=0.5 s. The following analyzes seven different cases a, b, c, d, e, f, and g shown in FIGS. 3A-3G in combination with the time sequence diagram shown in FIGS. 3A-3G.

Figure 3A:
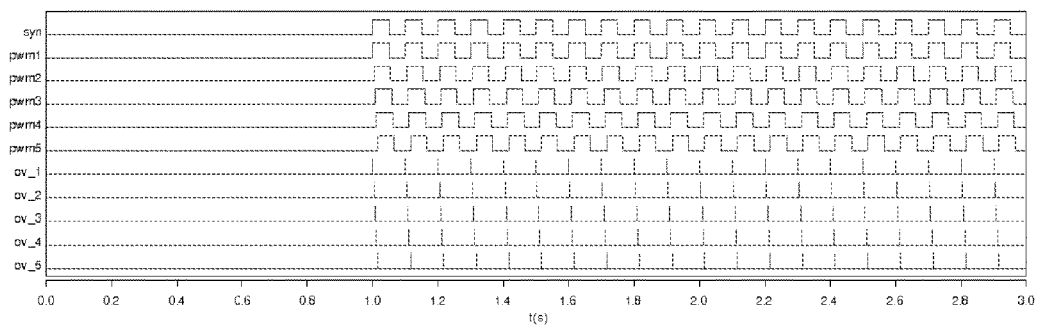
FIG. 3A is an operation time sequence diagram.
Figure 3B:
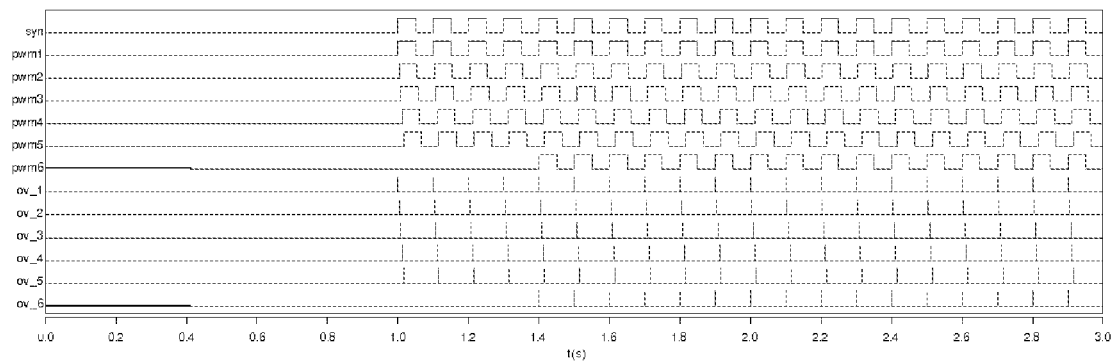
FIG. 3B is an operation time sequence diagram when a module is hot-plugged.
Figure 3C:
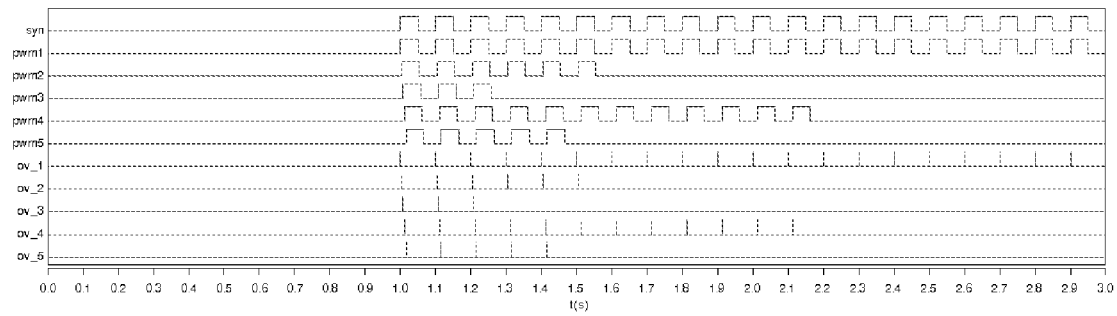
FIG. 3C is an operation time sequence diagram when a non-Syn module is hot-unplugged.
Figure 3D:
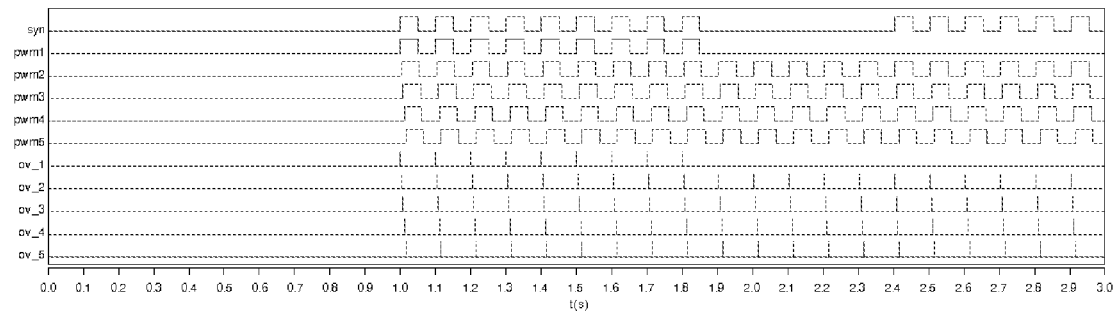
FIG. 3D is an operation time sequence diagram when an original Syn module is hot-unplugged.
Figure 3E:
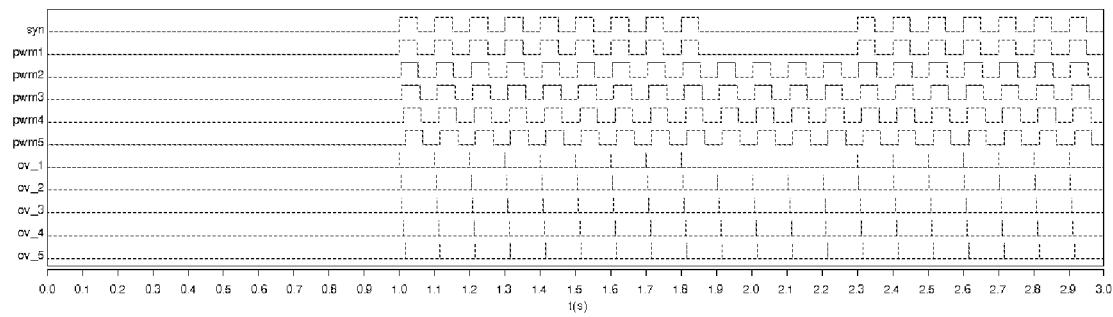
FIG. 3E is an operation time sequence diagram when a Syn loss time is less than a preset value.
Figure 3F:
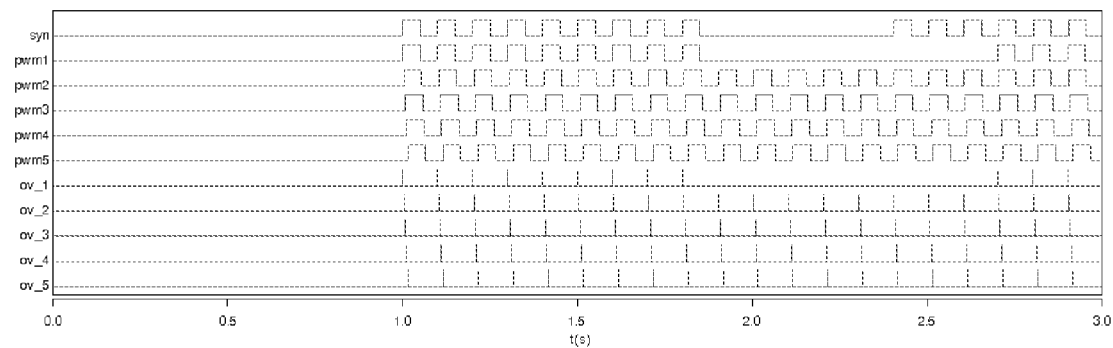
FIG. 3F is an operation time sequence diagram when a Syn loss time is greater than or equal to a preset value.
Figure 3G:
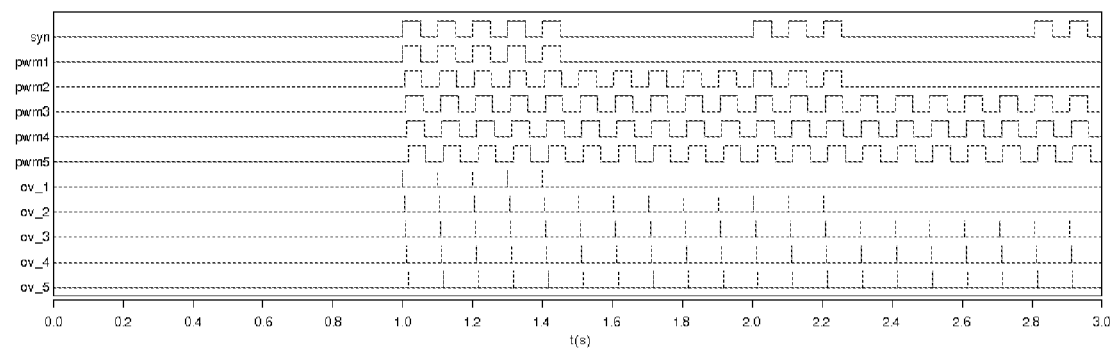
FIG. 3G is a time sequence diagram when two original Syn modules are unplugged in different time periods.

(a) Assuming that five synchronization modules are powered on at moment t=0, due to the difference in the running time of the five synchronization modules, the respective PWM overflow interrupt signals appear at different times (or five synchronization modules are powered on at the same time, factors such as line impedance and inconsistent component parameters will inevitably lead to the difference in the running time of the five synchronization modules). As shown in FIG. 3A, after a delay of 0.1 s, a PWM overflow signal OV_1 of synchronization module 1 appears the earliest, a rising edge appears at En of a switch control module circuit, triggering CTL to change from 0 to 1, the switch S1 is turned on, and PWM1 is output to Syn, that is, PWM1 becomes Syn through contention. After Syn appears, a rising edge appears at Lock of the switch control module circuit, the En function is locked, all the switch control module circuits in the system do not receive the OV_i signal, $Ctl_i$ of other synchronization module circuits remains at 0, and the switch S1 remains open to disconnect PWM2 to PWM5 from Syn. In addition, the appearance of Syn causes the timing value of the synchronization bus monitoring module to be reset to zero.

(b) Under the condition of (a), synchronization module 6 is hot-plugged at moment 0.4 s. Because no Syn signal is lost within the 1-second power-on delay time of module 6 (that is, a Syn signal is present between moments 0.4 s and 1.4 s), module 6 has definitely received the Syn signal before 1.4 s, and therefore locks En of module 6 and resets the timing value of the synchronization bus monitoring module to zero. Because En is locked, CTL of module 6 remains at 0, S1 is open, and the synchronization signal Syn is not affected.

(c) Under the condition of (a), synchronization modules 3, 5, 2 and 4 are hot-unplugged at moments 1.3 s, 1.5 s, 1.6 s, and 2.2 s, respectively. Since these circuits are not Syn signal provision modules, Syn is not affected.

(d) Under the condition of (a), synchronization module 1 is hot-unplugged at moment 1.9 s. Because the module is a Syn signal provision module, the Syn signal is lost. When Syn loss occurs in five consecutive periods (that is, at 2.4 s), Reset of the synchronization bus monitoring module has a high level. The high-level Reset signal resets the switch control module and enables En to receive the signal. After moment 2.4 s, an overflow signal OV_2 of signal generation module 2 appears the earliest, so the control signal CTL output by the switch control module changes from 0 to 1, S1 is turned on, and PWM2 is output to Syn, that is, PWM2 becomes a new Syn through contention. After the new Syn appears, a rising edge appears at Lock of all switch control modules in the system, all switch control modules are prohibited from receiving OV_i signals, $Ctl_i$ of other synchronization modules remain at 0, and the switch S1 remains open to disconnect $PWM_i$ (i≠2) from Syn. In addition, the appearance of Syn again causes the timing value of the synchronization bus monitoring module to be reset to zero.

(e) Under the condition of (a), due to factors such as poor contact caused by short-term severe vibration PWM1 has lost signals at 1.9 s to 2.3 s, that is, there is no Syn signal. Because the number of consecutively lost Syn signals is less than 5, no contention for a new Syn is triggered. Therefore, when PWM1 appears again at 2.3 s, PWM1 is still the Syn signal.

(f) Under the condition of (a), due to poor contact, interference, or component failure, PWM1 has lost signals at 1.9 s to 2.7 s, that is, there is no Syn signal. Because the number of consecutively lost Syn signals is greater than or equal to 5, contention for a new Syn is triggered. In this case, because a PWM overflow interrupt OV_2 of synchronization module 2 is the closest to 2.4 s, PWM2 becomes the new Syn signal through contention. The detailed working process is the same as (d) and is not repeated herein.

(g) Under the condition of (a), synchronization module 1 is hot-unplugged at moment 1.5 s. Because the module is a Syn signal provision module, the Syn signal is lost. When Syn loss occurs in five consecutive periods (that is, 2.0 s), one of PWM2 to PWM5 competes to become a new Syn. Because a PWM overflow interrupt OV_2 of synchronization module 2 is closest to 2.0 s, PWM2 becomes the new Syn signal through contention. After the new Syn appears, synchronization module 2 is hot-unplugged at moment 2.3 s. Because the module is a new Syn signal provision module, the Syn signal is lost again. When Syn loss occurs in five consecutive periods (that is, 2.8 s), one of PWM3 to PWM5 competes to become a new Syn. Because a PWM overflow interrupt OV_3 of synchronization module 3 is the closest to 2.8 s, PWM3 becomes the new Syn signal through contention. After the new Syn signal appears, the detailed working process is the same as (d) and is not repeated herein.

In conclusion, the system synchronization method provided in the present invention has the advantages of simple structure, low cost, and good practicability.

What is claimed is:

1. A system synchronization method, comprising: connecting synchronization modules of a plurality of devices together through a synchronization bus, wherein
the synchronization modules comprise a signal generation module, a switch control module, a synchronization bus monitoring module, and a switch S1;
a signal output terminal of the signal generation module is connected to a first terminal of the switch S1, and a timing overflow terminal of the signal generation module is connected to the switch control module configured to control the switch S1;
the switch control module is connected to the synchronization bus monitoring module; and
a second terminal of the switch S1 is connected to the switch control module and the synchronization bus monitoring module;
wherein the synchronization modules comprise:
the signal generation module, wherein an input of the signal generation module is connected to a power supply Power, an output signal $PWM_i$ of the signal generation module is connected to an input of the switch S1, and a timing overflow signal OV_i of the signal generation module is connected to an enable terminal En of the switch control module;
the switch S1, wherein the input of the switch S1 is connected to $PWM_i$, an output of the switch S1 is connected to the synchronization bus, and the switch S1 is controlled by an output signal $Ctl_i$ of the switch control module to allow $PWM_i$ to be connected to or disconnected from the synchronization bus;
the switch control module, wherein the enable terminal En of the switch control module is connected to OV_i of the signal generation module, a lock terminal Lock of the switch control module is connected to the synchronization bus, a reset terminal Rst of the switch control module is connected to an output Reset of the synchronization bus monitoring module, and the output signal $Ctl_i$ of the switch control module is connected to the switch S1; and
the synchronization bus monitoring module, wherein an input of the synchronization bus monitoring module is connected to the synchronization bus, the output Reset of the synchronization bus monitoring module is connected to the reset terminal Rst of the switch control module, and the synchronization bus monitoring module is configured to monitor whether a signal loss time of the synchronization bus exceeds a preset time.

2. The system synchronization method according to claim 1, wherein the signal generation module works in the following way: when a system is powered on, the signal generation module enables an internal power-on delay function; after a delay is over, an internal timer with a period of T starts to work, and $PWM_i$ with a duty cycle of 0.5 and a periodic overflow pulse signal OV_i are output, wherein $PWM_i$ and OV_i have an identical period; the output signal $Ctl_i$ of the switch control module controls on or off of the switch S1, and further controls $PWM_i$ to be connected to or disconnected from the synchronization bus, thereby functioning as a bus control switch and generating a synchronization signal Syn.

3. The system synchronization method according to claim 1, wherein the switch control module works in the following way: when no rising edge exists at an input terminal Lock and Reset is at a low level, when OV_i has a rising edge, $Ctl_i$ changes from a low level to a high level and is locked; in this case, the switch S1 is turned on, the signal $PWM_i$ is output to the synchronization bus, and Syn is generated; once Syn is generated, a rising edge appears at Lock of the switch control module, the switch control module locks En to terminate receiving OV_i, and $Ctl_i$ remains at a high level; in addition, a current timing value of an internal tuner of the synchronization bus monitoring module is reset to zero; since Syn is a periodic signal, as long as a period of Syn is less than a period of the internal timer of the synchronization bus monitoring module, the output Reset of the synchronization bus monitoring module is not at a high level.

4. The system synchronization method according to claim 1, wherein the synchronization bus monitoring module is configured to monitor whether a synchronization signal Syn on the synchronization bus is lost; when the signal loss time exceeds a timing value preset inside the synchronization bus monitoring module, an output reset signal Reset is at a high level, and when the signal loss time does not exceed the timing value preset inside the synchronization bus monitoring module, the output reset signal Reset is at a low level; a current timing value of a timer is in unilateral increment mode, when the timing value reaches a preset value, the timing value remains at the preset value, and Reset remains at a high level; once a rising edge is monitored at Syn, the current timing value of the timer is immediately reset to zero, and Reset is reset to zero.

\* \* \* \* \*